United States Patent
Williamson et al.

(10) Patent No.: US 8,234,489 B2
(45) Date of Patent: Jul. 31, 2012

(54) SET OF SYSTEM CONFIGURATION REGISTERS HAVING SHADOW REGISTER

(75) Inventors: David James Williamson, Austin, TX (US); James Nolan Hardage, Austin, TX (US)

(73) Assignee: ARM Limited, Cambridge (GB)

( * ) Notice: Subject to any disclaimer, the term of this patent is extended or adjusted under 35 U.S.C. 154(b) by 380 days.

(21) Appl. No.: 12/458,560

(22) Filed: Jul. 15, 2009

(65) Prior Publication Data

US 2011/0016338 A1 Jan. 20, 2011

(51) Int. Cl.
G06F 1/24 (2006.01)
G06F 9/00 (2006.01)
(52) U.S. Cl. .................................... 713/100; 713/165
(58) Field of Classification Search .................. 713/100, 713/165
See application file for complete search history.

(56) References Cited

U.S. PATENT DOCUMENTS

| 5,864,657 | A * | 1/1999 | Stiffler | 714/15 |
| 6,275,888 | B1 * | 8/2001 | Porterfield | 710/312 |
| 6,615,344 | B1 * | 9/2003 | Hagen | 713/1 |
| 2003/0131206 | A1 * | 7/2003 | Atkinson et al. | 711/156 |
| 2008/0104378 | A1 * | 5/2008 | Huang et al. | 713/1 |
| 2010/0077164 | A1 * | 3/2010 | Stiffler et al. | 711/162 |
| 2011/0078383 | A1 * | 3/2011 | Bentley et al. | 711/141 |

* cited by examiner

*Primary Examiner* — Vincent Tran
(74) *Attorney, Agent, or Firm* — Nixon & Vanderhye P.C.

(57) ABSTRACT

A processor is disclosed having a plurality of general purpose registers for storing data for processing by the processor; a set of system configuration registers for storing data indicative of a current configuration of the processor; the system configuration registers being located together in a register file; and at least some of the set of system configuration registers having a shadow register for storing a duplicate value remote from the register file, the shadow register being located close to a component that the shadow register stores a configuration value for.

18 Claims, 4 Drawing Sheets

SET OF SYSTEM CONFIGURATION REGISTERS HAVING SHADOW REGISTER

BACKGROUND OF THE INVENTION

1. Field of the Invention

The field of the invention relates to data processors and in particular to the storage of system configuration data on these data processors.

2. Description of the Prior Art

Processors need to store data that is to be processed and instructions for controlling the processing of this data. When using this information, the processor may store it in general purpose registers where it is easy and quick to access. With increasing parallelism of processors which may involve instructions executing out of order, it may be necessary to keep more than one copy of a data value and this is done by renaming the general purpose registers that store this data.

Processors also store information regarding the configuration of the processor. This data is data that the software uses to configure the hardware rather than internal program data. This data is stored in system configuration registers, which are registers that are generally not accessed often, but store data that is required for the system to operate correctly. The values held in system configuration registers configure the hardware and as such tend to be located close to the hardware component that they relate to. An example of such a register is the page table base register which is used on tablewalks. Another example is the configuration register which indicates if caches, MMU and other memory system features have been enabled. As noted above because of their usage model these registers tend to be located physically close to where they are used.

A drawback of this distributed model is that it can make architectural reads and writes of these register values slow to execute.

SUMMARY OF THE INVENTION

A first aspect of the present invention provides a processor for processing data comprising: a plurality of general purpose registers for storing data for processing by said processor; a set of system configuration registers for storing data indicative of a current configuration of said processor; said set of system configuration registers being located in a register file; and at least some of said set of system configuration registers having a shadow register for storing a duplicate value remote from said register file, said shadow register being located close to a component that said shadow register stores a configuration value for.

With the desire to make processors ever smaller there is a technical prejudice against providing additional registers that simply store duplicate values. However, it has been found that providing a register file that holds special configuration registers together in a single register file while still providing at least some of the special configuration registers close to their associated components provides several advantageous effects. Firstly, by providing the registers in a single register file, they can be written to and read from easily. Furthermore, by providing a central resource for architectural copies of these registers that is fast and easy to access while also providing local copies of some of these registers as needed, the values are readily available for use both within the memory system and within other units of the processor. This can increase the speed of many operations of the processor.

There are for example, circumstances where many of the system configuration registers need to be accessed at the same time. For example, this may occur on set up or in a power down situation. In these circumstances it is advantageous if these registers can be accessed by simply accessing a single register file, rather than having to access registers distributed throughout the processor. This allows these operations to be performed much more quickly and efficiently. Given the increasing tendency of modern devices to power down whenever possible any design that eases this process provides a significant advantage.

In some embodiments, said system configuration registers comprise at least one of: a page table base register, a cache configuration register, a vector table base register, a security access control register, a fault status register, a domain access control register and a timer control register.

The system configuration registers are those that are used by the software to configure the hardware and are generally related to hardware features and are used for holding data indicative of the hardware rather than data that is being processed by the software.

In some embodiments, said register file further comprises: a plurality of update storage locations corresponding to at least some of said system configuration registers that have shadow registers for storing an update value indicative of whether said corresponding shadow registers store a valid value; said processor being responsive to a write request to one of said system configuration registers having one of said update storage location to update said system configuration register in said register file and to update said update storage location with a value indicating said shadow register does not currently store said valid value.

In order for the shadow registers to stay synchronised with the corresponding register in the register file, an update value is provided that is associated with the system configuration register. Thus, when a system configuration register in the register file that has one of these update storage locations is updated the update storage location is set to a value that indicates that the shadow register does not currently store a valid value. In this way, the system knows that the shadow register needs to be updated with the new value at an appropriate moment. There can be update values for each of the system configuration registers that have shadow registers, or there can be fewer update values some referring to a group of registers.

It should be noted that although generally the system configuration registers have a single shadow register, there may be occasions where it is desirable to store the value in proximity to more than one hardware component and in such a case the system configuration register may have more than one shadow register, in such cases the update value associated with the system configuration register provides an indication of the validity of the value stored in all associated shadow registers.

In some embodiments, said register file further comprises at least one of a status register and an ID register.

As well as the system configuration registers, the register file may also comprise other registers that it is convenient to have access to at the same time as the system configuration registers. These registers may include status registers and ID registers. For these registers it is not appropriate to have a shadow register as they are not associated with particular hardware components or at least are not required to configure them and as such they do not need to be located in the processor in a distributed fashion. However, they often need to be accessed at the same time as the system configuration registers, for example on power down and as such it is convenient to have them located in the same register file.

In some embodiments, said processor is configured to copy data stored in all of said system configuration registers having an update value indicating that said corresponding shadow register does not hold a valid value, to said corresponding shadow register in response to an instruction synchronisation event and to amend all of said update values to indicate that all of said shadow registers contain valid values.

Updating the shadow registers may occur on an individual basis at convenient moments during processing, however, it may also be advantageous if in response to certain events all of them are updated, so that at this point the processor knows that all shadow registers hold valid values. In some embodiments this point is an instruction synchronisation event and thus, following one of these the shadow registers are updated one can be sure that the shadow registers hold valid values.

In some embodiments, said instruction synchronisation event comprises a taking of an exception, returning from an exception and an execution of an instruction synchronisation barrier instruction.

Exceptions carry an overhead, taking time to process and as such, it is a good time to hide the overhead of updating the shadow register by performing this procedure in response to the exception and/or in response to returning from the exception. There are also instruction synchronisation barrier instructions which are used to ensure that the device is synchronised and in response to these it is important that the shadow registers are updated as the system will assume that following such an event the shadow registers hold a valid value.

In some embodiments, said register file further comprises at least one group valid storage location for storing a group value indicative of whether all of said shadow registers in a group of shadow registers hold valid values, said processor being responsive to said instruction synchronisation event to read said at least one group value and if said at least one group value indicates all of said shadow registers within said group hold valid values not to update any of said shadow registers within said group and if said group value does not indicate this to read each of said update values for registers in said group.

It may be advantageous to group the system configuration registers that it is likely will be updated at the same time together. Thus, when looking to see which registers need updating, rather than looking at the update value for each of the system configuration register in a group, the group value can be read and only if this indicates that some of the shadow registers may have invalid values do the individual update values need to be read. In some embodiments where the system configuration registers are always updated together then there will only be a group value and these registers will not have individual update values.

In some embodiments, said processor is responsive to all instructions to read or write to one of said system configuration registers, to access said system configuration register in said register file and not to access said shadow register.

It is advantageous if all instructions to read or write the system configuration registers access the system configuration registers in the register file. In this way, these registers can be read from and written to quickly and efficiently. Also all read and writes are guaranteed to occur in program order, so any write followed by a read to the same register will be guaranteed to read the new value even if a shadow copy of that register has not been updated. The updating of the shadow registers can occur later when convenient.

The set of system configuration registers that are stored in a single file may in some embodiments comprise all of the system configuration registers that are present in the processor. In other embodiments they may comprise all of the system configuration registers that store data required on a context switch.

On a context switch the architectural state of the processor needs to be stored out and having it together in a single register file rather than distributed in different registers means that context switches can be performed much more quickly and efficiently.

In some embodiments, said processor is responsive to a sleep signal indicating said processor is to enter a low power mode to continue to power said register file and to power down said processor.

Having all the architectural state in one place provides the possibility of creating a power island where architectural state can be stored, allowing the rest of the processor which includes the shadow registers to be powered down. Many of the shadow registers are located on the processor close to the hardware components that they configure and are thus, powered down when the processor is powered down. Having a register file containing the system configuration registers that can retain power in sleep mode, allows the processor to be powered down without first having to save state from the system control registers to the memory. This enables a low power state to be entered extremely quickly. It should be noted that in some embodiments the general purpose registers are powered in sleep mode, while in other embodiments they are powered down. In the latter case, their state needs to be saved prior to powering them down.

In some embodiments, said processor supports register renaming and said system configuration registers are registers that are not subject to said renaming.

Register renaming occurs in many processors where it is desirable to have hardware for temporary copies of data values, where for example, these data values are being used often and perhaps by multiple processors. In such processors the general purpose registers are subject to register renaming, however, the system configuration registers do not hold values that are used often in the processor and as such, are not registers that support renaming.

A second aspect of the present invention provides a method of storing data indicative of a current configuration of components of a processor, comprising the steps of: writing said data to a system configuration register located in a register file, said register file comprising a set of system configuration registers for said processor; wherein at least some of said set of system configuration registers have a shadow register for storing a duplicate value remote from said register file, said shadow register being located close to said component that said shadow register is configuring; and if said system configuration register written to has a shadow register, updating an update value within said register file corresponding to said system configuration register with a value indicating that a value stored in said corresponding shadow register is not valid.

A third aspect of the present invention provides a means for processing data comprising: a plurality of general purpose storage means for storing data for processing by said processor; a set of system configuration storage means for storing data indicative of a current configuration of said processor; said set of system configuration storage means being located in a register file; and at least some of said set of system configuration storage means having a shadow storage means for storing a duplicate value remote from said register file, said shadow storage means being located close to a component that said shadow storage means stores a configuration value for.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
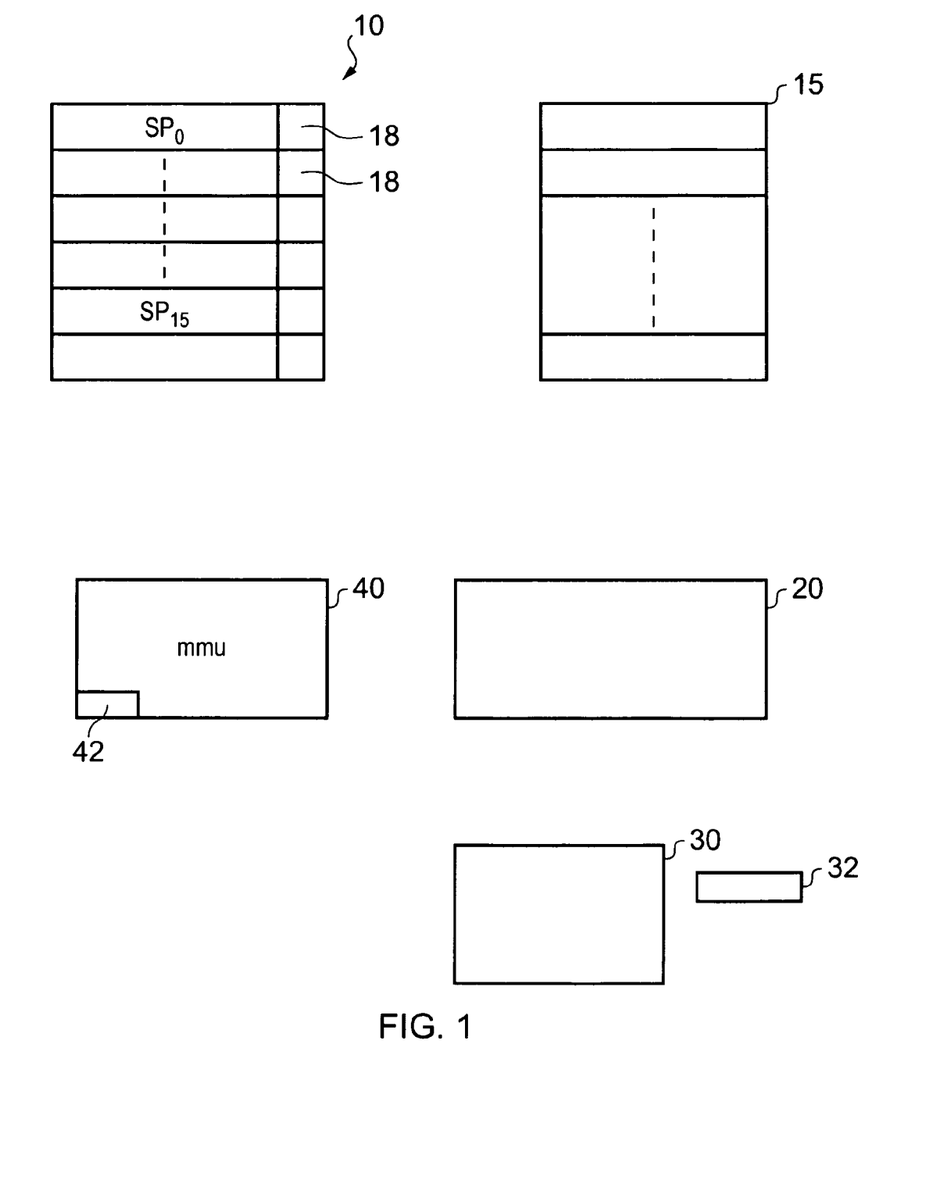
FIG. 1 shows a processor according to an embodiment of the present invention.

FIG. 1 shows a portion of a data processing apparatus according to an embodiment of the present invention. This data processing apparatus comprises a register file 10 for holding system configuration registers. It also comprises an execution unit 20, cache 30 and memory management unit 40. Register file 10 holds the system configuration registers SP0 to SP15 and also holds other registers that contain state of the processor and are required are a context switch.

Some of the system configuration registers SP0 to SP15 have shadow registers close to the hardware component that they configure and these special configuration registers have update storage elements 18 associated with them. These update storage elements 18 store update values indicative of whether or not the associated shadow register holds a valid value. Examples of the shadow registers are shown as the special configuration register 32 for the cache 30 which indicates whether or not the cache 30 is enabled and system configuration register 42 in the memory management unit 40 that holds the base address of the page table which is required on a table walk.

Special purpose register file 10 is accessed in parallel with a general purpose register file 15, the general purpose register file 15 being used by the program for storing data and instructions being processed.

When a register read occurs to the special purpose register file 10 the value can be immediately returned from this register file and similarly when a register write occurs the architectural version of the register in this file is immediately updated, provided that the instruction updating it is not speculative. When the value is updated then the update storage element 18 has its bit set to indicate that the shadow register does not hold a valid copy. By reading and writing to the version of the system configuration register in the special purpose register file 10, then any write followed by a read for the same register will be guaranteed to read the new value even if the shadow copy of that register has not been updated, as all read and writes are guaranteed to occur in program order.

The shadow registers are present and are used by the component that they configure and thus, they do need to be updated at some point. In embodiments of the invention these are automatically updated in response to an instruction synchronisation event. These events may be the taking of an exception or the returning from an exception. An exception takes time to implement and as such, the time taken to update the shadow registers can be hidden in the time taken to process the exception, thus this is a convenient time to perform this update action. There may be other times when it is important that the processor is synchronised and that the shadow registers contain valid values. Thus, the processor can use instruction synchronisation barrier instructions to cause synchronisation of the processor and ensure that the shadow registers are updated. Thus, at a point where it is important that these shadow registers hold a valid value such an instruction can be executed.

Whenever an instruction synchronisation event occurs, a state machine is activated to walk through the system configuration registers to check if any shadow copies need to be updated. This is done by reading the update storage locations 18. In this embodiment there is a single update storage location for each register that has a shadow, but in other embodiments as will be described later there may be group update values such that only the group value needs to be read to determine if a group of shadow registers need to be updated.

Whenever a register is found that requires updating then a transaction will be initiated to update the local copy of the shadow register. This handshake can include a serialisation request to prevent register updates from occurring in the middle of processor activity. Updating the page table base register in the middle of a table walk for example would generate errors. As the shadow register copies are updated the corresponding update bit for that register is cleared.

It should be noted that some registers may have multiple shadow copies in which case multiple updates are performed. In some embodiments there is a single update bit for all the shadow registers and when they are all updated this single value is cleared. In other embodiments the register files keep an update storage location for each shadow register and these are updated individually as the corresponding shadow registers are written to.

In addition to the system configuration registers that have shadow copies for configuring the hardware, the special purpose register file 10 contains other registers that indicate the state of the system. For example, it may contain registers that are associated with specific exception types and these are always checked for updates when the exception type occurs. For example, there could be a fault register which indicates that a fault has occurred in one unit. In such a case that fault register is updated at the time of the fault and a copy of it is sent to the special purpose register file. This means that the special purpose register file 10 contains a value indicative of the fault and the special purpose register file itself can be read for example on a context switch to determine this information.

As can be seen from this diagram the special purpose register file 10 comprises a number of registers including system configuration registers for holding values configuring the hardware and also other registers indicating the state of the machine. By providing all of these registers in a single register file, state saving can be performed more quickly than if this information was stored in a distributed fashion and this allows faster entry into a power-down state. Furthermore, if register file 10 has a low power retention state then this state can be entered in low power mode and the architectural state saved without the need to save it to memory.

Alternatively, in some embodiments this register file may be powered in such a way that on power down of the processor it retains its power. If the required architectural state of the processor is stored in this register file 10, then this design enables low power mode to be entered very quickly without the need to save state to memory first.

It should be noted that although it may be advantageous to have all registers required on say a context switch or on power down in this single register file, if only the system configuration registers that have shadow registers distributed throughout the processor are in this register file then even though other registers may need to be accessed in power down or on a context switch it will still be advantageous to have this register file as the distributed arrangement of the shadow registers makes them particularly hard and time consuming to access and thus, providing a copy of just them in a single register file is advantageous.

Figure 2:
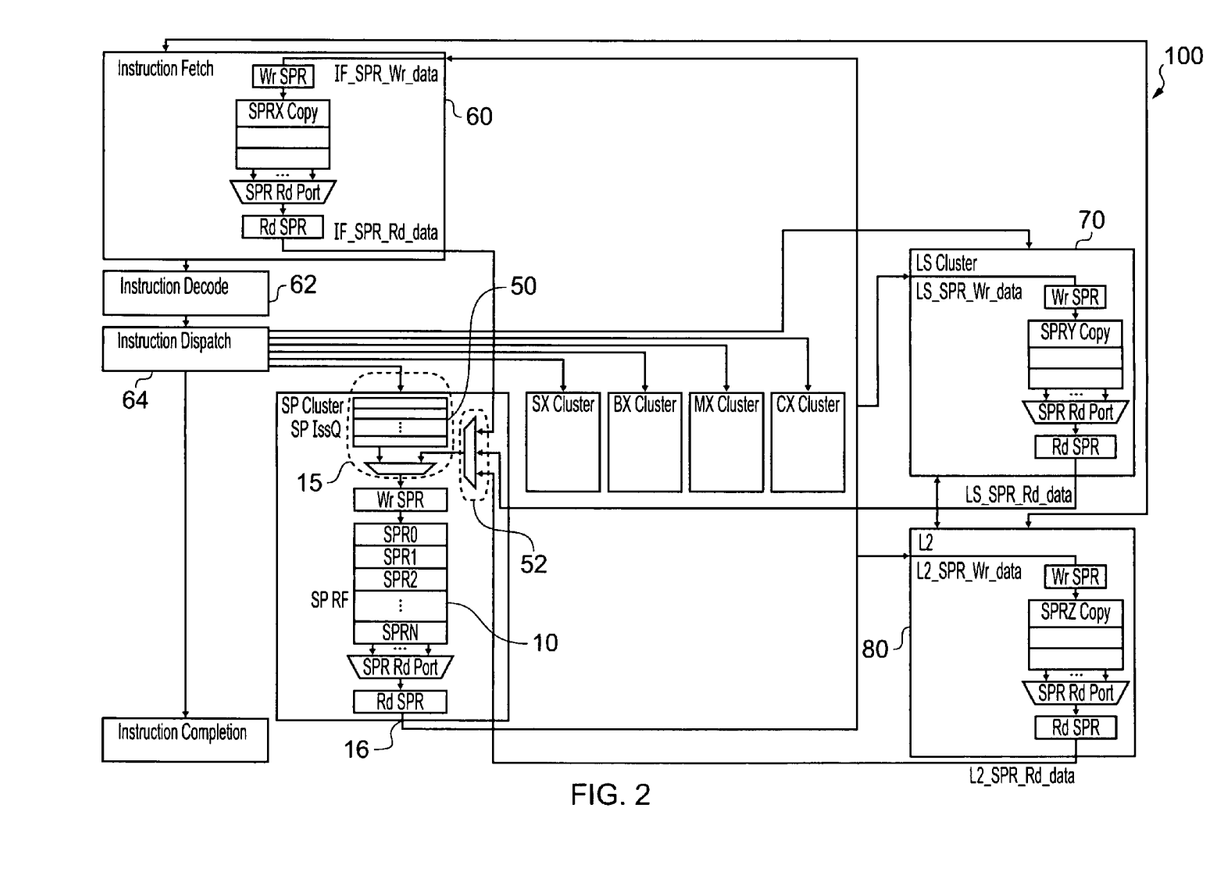
FIG. 2 shows a portion of a processor according to an embodiment of the present invention.

FIG. 2 shows a portion of a data processing apparatus 100 according to an embodiment of the present invention. This data processing apparatus has a special purpose register file 10 which contains the system configuration registers within storage circuitry 15. This storage circuitry 15 has an issue queue 50 which comprises instructions waiting to access the register file 10 and these can be instructions to write data to the register file or to read data from the register file via the read port 16.

Data processing apparatus 100 also has an instruction fetch unit 60 which comprises shadow copies of some of the special configuration registers. These may be the base page table registers and may also include an instruction cache enable register. There is also cache circuitry 70 and 80 which themselves contain special configuration registers relevant to the caches. It may be that some of the shadow copies of the special configuration registers are present in multiple places, thus the instruction fetch unit 60 may have a shadow register indicating if the instruction cache is enabled or not and the instruction cache itself may have a duplicate copy of this shadow register.

FIG. 2 shows the instruction route where an instruction is fetched by instruction fetch unit 60, it is then sent to instruction decoder 62 where it is decoded and it is then dispatched via instruction dispatch unit 64 to the various clusters where it is executed. The instructions may be executed out of order by the various clusters.

Storage circuitry 15 may receive an instruction from the instruction dispatch unit 64 to either read or write to a special configuration register stored in register file 10. Such an instruction will enter the instruction queue 50 and be issued. The storage circuitry 15 may also receive instruction requests from other units thus, one of the caches may send a request to read the register file version of its shadow register and this arrives at multiplexer 52 and is processed by circuitry 15.

Any read instruction that passes through circuitry 15 will output the read value via read port 16 and this will be sent back to the unit that requested it.

Figure 3:
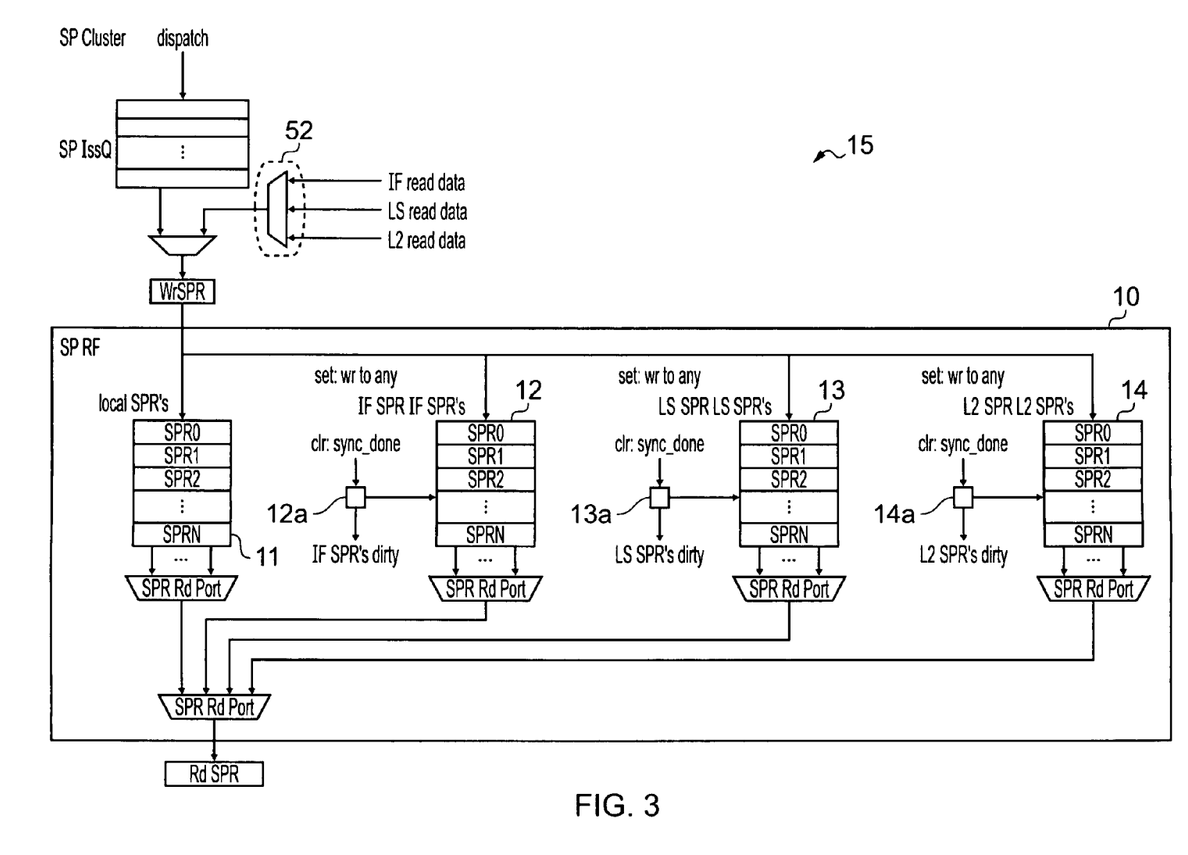
FIG. 3 shows the storage circuitry of FIG. 2 in greater detail.

Thus, a version of the system configuration registers is held in register file 10 and this is always the current version so that any instructions to update these register values will be processed by circuitry 15 and these versions will be updated first. This updated value may then be copied to a corresponding shadow register. In order to be able to keep account of which registers have been updated and which have not, update bits may be associated with the system configuration registers that indicate whether or not the corresponding shadow registers hold valid values. The storage elements for storing these values are not shown in FIG. 2. FIG. 3 shows a more detailed diagram of circuitry 15 which includes the storage locations for the update values.

FIG. 3 shows special register file 10 and associated circuitry 15 according to an embodiment of the present invention. As previously mentioned instructions are received from instruction dispatch and form a queue. Other instructions requesting read access to the register file may also arrive from other locations and are sent by a multiplexer 52 to the register file 10.

In this embodiment the register file 10 store the system configuration registers in groups, these groups being groups of registers that are updated together. Thus, there is a group 11 of system configuration registers that do not have shadow registers and these therefore do not need to have update information stored associated with them. In this embodiment three other groups of system configuration registers 12, 13 and 14 are shown and each of these has update storage location 12a, 13a and 14a associated with them.

In this embodiment the registers in groups 12, 13 and 14 are always written at the same time and in response to receiving a write request to write these registers the corresponding update bit in the corresponding storage location is set to indicate that the shadow registers no longer hold a valid value. When an instruction synchronisation event occurs which is either an exception, a return from an exception or a synchronisation barrier instruction executing then the update values are read and any group of registers that hold values where the shadow registers do not hold valid values have their values copied to the shadow registers and the update bit is reset to indicate that the shadow registers of this group now store valid values. In this way, the processor can by synchronised so that the shadow registers hold the correct values.

Having a centralised register file that holds current information allows it to be written into the processor and read out of the processor quickly and efficiently where required, for example at set up or in response to a context switch. Having update information associated with these registers where there is a shadow register allows the update of the shadow registers to be performed in an efficient manner when required and thus, allows the processor to have the required values close to the components that they are configuring when this is needed.

Figure 4:
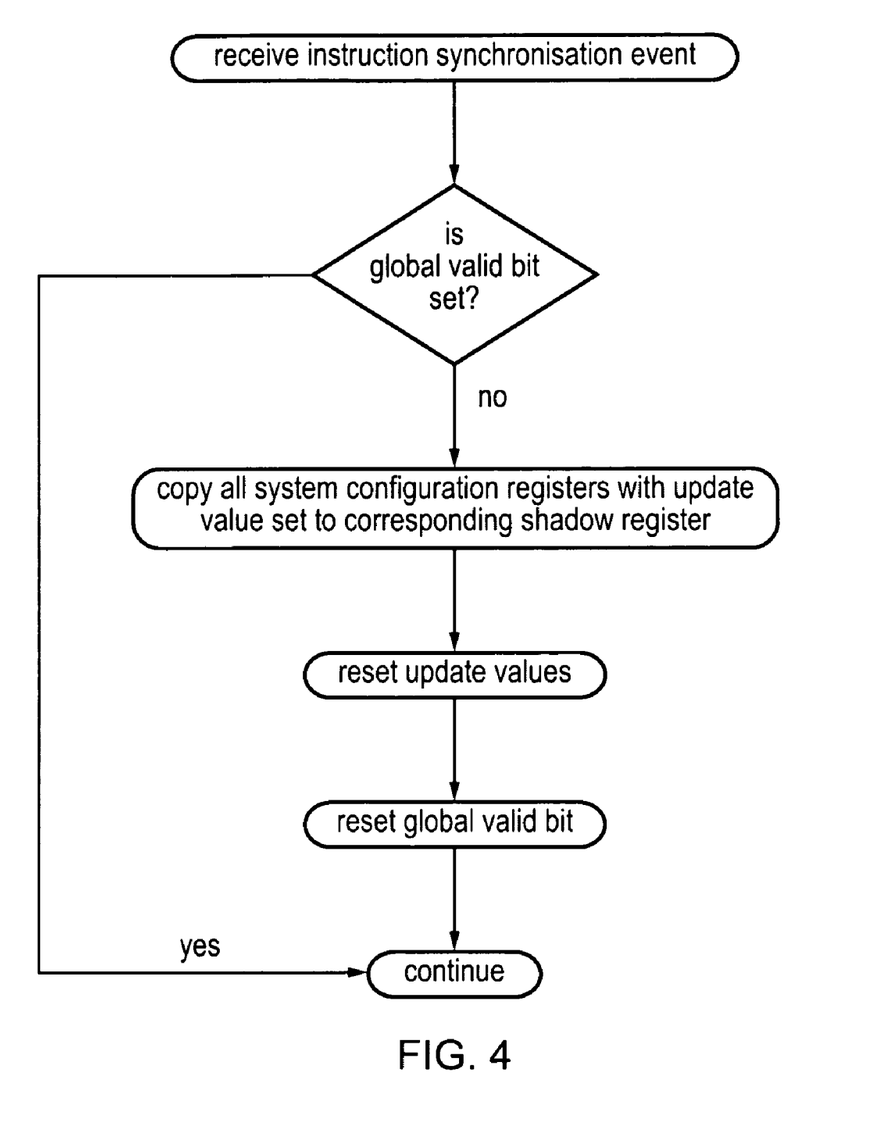
FIG. 4 shows a flow diagram illustrating a method of updating shadow system configuration registers according to an embodiment of the present invention.

FIG. 4 shows a flow diagram illustrating a method according to an embodiment of the present invention. In this method, initially an instruction synchronisation event is received and it is then determined if a global valid bit is set for the register file holding the system configuration registers. If it is then the processor continues performing other synchronisation events. If it is not then all system configuration registers with update values that are set are copied to the corresponding shadow registers and their update values are reset. When this has been done the global valid bit is reset and the processor continues. This is just one method of updating the shadow registers. It should be noted that in some embodiments there is no global valid bit while in other embodiments there are group valid bits for groups of registers and these are read for each group and it is determined whether the group needs updating or not.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. A processor for processing data comprising:
   a plurality of general purpose registers for storing data for processing by said processor;
   a set of system configuration registers for storing data indicative of a current configuration of said processor;

said set of system configuration registers being located in a register file; and at least some of said set of system configuration registers having a shadow register for storing a duplicate value remote from said register file, said shadow register being associated with a component for which said shadow register stores a configuration value, wherein said register file further comprises a plurality of update storage locations corresponding to said system configuration registers that have shadow registers for storing an update value indicative of whether said corresponding shadow registers store a valid value and said processor is responsive to a write request to one of said system configuration registers having one of said update storage locations to update said system configuration register in said register file and to update said update storage location with a value indicating said shadow register does not currently store said valid value.

2. A processor according to claim 1, wherein said system configuration registers comprise at least one of:
a page table base register, a cache configuration register, a vector table base register, a security access control register, a fault status register, a domain access control register and a timer control register.

3. A processor according to claim 1, wherein said register file further comprises at least one of a status register and an ID register.

4. A processor according to claim 1, wherein said processor is responsive to all instructions to read or write to one of said system configuration registers, to access said system configuration register in said register file and not to access said shadow register.

5. A processor according to claim 1, wherein said set of system configuration registers comprise all of said system configuration registers in said processor.

6. A processor according to claim 1, wherein said set of system configuration registers comprise all of said system configuration registers that store data required on a context switch.

7. A processor according to claim 1, said processor being responsive to a sleep signal indicating said processor is to enter a low power mode to retain power to said register file and to power down said processor.

8. A processing according to claim 1, wherein said processor supports register renaming and said system configuration registers are registers that are not subject to said renaming.

9. A processor for processing data comprising:
a plurality of general purpose registers for storing data for processing by said processor;
a set of system configuration registers for storing data indicative of a current configuration of said processor;
said set of system configuration registers being located in a register file; and
at least some of said set of system configuration registers having a shadow register for storing a duplicate value remote from said register file, said shadow register being associated with a component for which said shadow register stores a configuration value, wherein said processor is configured to copy data stored in all of said system configuration registers having an update value indicating that said corresponding shadow register does not hold a valid value, to said corresponding shadow register in response to an instruction synchronisation event and to amend all of said update values to indicate that all of said shadow registers contain valid values.

10. A processor according to claim 9, wherein said instruction synchronisation event comprises a taking of an exception, returning from an exception and an execution of an instruction synchronisation barrier instruction.

11. A processor according to claim 9, said register file further comprising at least one group valid storage location for storing a group value indicative of whether all of said shadow registers in a group of shadow registers hold valid values, said processor being responsive to said instruction synchronisation event to read said at least one group value and if said at least one group value indicates all of said shadow registers within said group hold valid values not to update any of said shadow registers within said group and if said group value does not indicate this to read each of said update values for registers in said group.

12. A method of storing data indicative of a current configuration of components of a processor, comprising the steps of:
writing said data to a system configuration register located in a register file, said register file comprising a set of system configuration registers for said processor; wherein
at least some of said set of system configuration registers have a shadow register for storing a duplicate value remote from said register file, said shadow register associated with said component that said shadow register is configuring; and
if said system configuration register written to has a shadow register, updating an update value within said register file corresponding to said system configuration register with a value indicating that a value stored in said corresponding shadow register is not valid.

13. A method according to claim 12, wherein in response to an instruction synchronisation event said method comprises further steps of:
copying data stored in all of said system configuration registers having an update value indicating that said corresponding shadow register does not hold a valid value, to said corresponding shadow register; and
amending all of said update values to indicate that all of said shadow registers contain valid values.

14. A method according to claim 13, wherein said instruction synchronisation event comprises a taking of an exception, returning from an exception and an execution of an instruction synchronisation barrier instruction.

15. A method according to claim 13, wherein said register file further comprises at least one group valid storage location for storing a group value indicative of whether all of said shadow registers in a group of shadow registers hold valid values, and in response to said instruction synchronisation event said method comprises the initial step of:
reading said at least one group value and if said at least one group value indicates all of said shadow registers within said group hold valid values not updating any of said shadow registers within said group and if said group value does not indicate this reading each of said update values for registers in said group.

16. A method according to claim 12, wherein in response to all instructions to read or write to one of said system configuration registers said method comprising the step of, accessing said system configuration register in said register file and not accessing said shadow register.

17. A method according to claim 12, wherein in response to a sleep signal indicating said processor is to enter a low power mode said method comprises the steps of:
retaining power to said register file; and
powering down said processor, said general purpose registers and said shadow registers.

18. A data processor comprising:
a plurality of general purpose storage means for storing data for processing by said processor;
a set of system configuration storage means for storing data indicative of a current configuration of said processor;
said set of system configuration storage means being located in a register file; and
at least some of said set of system configuration storage means including a shadow storage means for storing a duplicate value remote from said register file, said shadow storage means associated with a component for which said shadow storage means stores a configuration value, wherein said register file further comprises a plurality of update storage locations corresponding to said system configuration storage means that have shadow storing means for storing an update value indicative of whether said corresponding shadow storing means stores a valid value and said processor being responsive to a write request to one of said system configuration storage means having one of said update storage location to update said system configuration register in said register file and to update said update storage location with a value indicating said shadow storage means does not currently store said valid value.

* * * * *